(12) United States Patent
McKinney et al.

(10) Patent No.: US 6,217,099 B1
(45) Date of Patent: Apr. 17, 2001

(54) MULTI-LAYER PROTECTIVE SHEILD FOR STROLLER

(76) Inventors: Brendan P. McKinney; Siobhan Hannah Mary McKinney, both of 5019 N. Major Ave., Chicago, IL (US) 60630

( * ) Notice: Subject to any disclaimer, the term of this patent is extended or adjusted under 35 U.S.C. 154(b) by 0 days.

(21) Appl. No.: 09/353,369

(22) Filed: Jul. 14, 1999

Related U.S. Application Data
(60) Provisional application No. 60/092,693, filed on Jul. 14, 1998.

(51) Int. Cl.[7] ............................................. B62B 9/14
(52) U.S. Cl. ............ 296/77.1; 296/97.21; 296/107.02; 5/416; 280/47.38; 160/89
(58) Field of Search ........................ 296/97.21, 107.02, 296/77.1, 79, 80, 83, 102; 5/416; 160/352, 89, 127; 280/47.38, 650, 642, 644

(56) References Cited

U.S. PATENT DOCUMENTS

| 1,289,965 | 12/1918 | Tichenor | 296/107.02 |
|---|---|---|---|
| 2,789,863 | 4/1957 | Shimabukuro | 296/77.1 |
| 3,227,484 | 1/1966 | Merclean | 296/77.1 |
| 3,834,756 | 9/1974 | Grell | 296/136 |
| 4,582,355 | 4/1986 | Hall | 296/77.1 |
| 5,184,865 | 2/1993 | Mohtasham et al. | 296/77.1 |
| 5,494,329 | 2/1996 | Gonzalez et al. | 297/184.13 |
| 5,542,732 | 8/1996 | Pollman | 296/77.1 |
| 5,758,889 | 6/1998 | Ledakis | 280/47.38 |
| 5,975,558 | * 11/1999 | Sittu | 280/647 |
| 5,975,613 | * 11/1999 | Sippel | 296/77.1 |
| 6,012,756 | * 1/2000 | Clark-Dickson | 296/77.1 |
| 6,027,137 | * 2/2000 | Rura | 280/650 |
| 6,068,322 | * 5/2000 | Kuester | 296/97.21 |

FOREIGN PATENT DOCUMENTS

| 1198028 | 12/1985 | (CA) . |
|---|---|---|
| 2280180 | 10/1978 | (FR) . |

OTHER PUBLICATIONS

One Step Ahead, Late Summer 2000, p. 32.*

* cited by examiner

Primary Examiner—Joseph D. Pape
Assistant Examiner—Patrick Engle
(74) Attorney, Agent, or Firm—Richard C. Litman

(57) ABSTRACT

A multi-layer protective shield for a stroller with an inflatable frame supporting a series of layers providing protection against sun, rain, wind, and insects. The protective shield includes at least two protective layers. At least one layer is resistant to UV radiation. The layers include a film layer adapted to protect a child seated in the stroller from rain. The film layer is resistant to UV radiation. At least one layer is a netting layer adapted to protect the child from flying insects. The protective layers may include an opaque layer composed of a flexible metalized plastic material. The inflatable frame and the layers each pivot with respect to the stroller. The protective layers are supported by the frame. One or more fans may be included to encourage air circulation.

15 Claims, 5 Drawing Sheets

MULTI-LAYER PROTECTIVE SHEILD FOR STROLLER

CROSS-REFERENCE TO RELATED APPLICATION

This application claims the benefit of U.S. Provisional Pat. Application Ser. No. 60/092,693, filed Jul. 14, 1998.

BACKGROUND OF THE INVENTION

1. Field of the Invention

The present invention relates to stroller accessories generally, and specifically to a multi-layer protective shield for a stroller. The shield has an inflatable frame and provides protection against sun, rain, wind, and insects.

2. Description of Related Art

Babies and small children enjoy going for outings in strollers. Such outings are beneficial in many ways. Outings stimulate children and provide caregivers with needed exercise. Unfortunately, problems with sun, rain, wind, and insects can limit caregivers from taking children for walks.

During an outing, the weather and the child's needs can change quickly. Children generally like to see as much of their surroundings as possible and object if their view is blocked. But if the child falls asleep during the outing, he may be disturbed by sun and movement around him. Rainstorms can come up suddenly and unexpectedly.

A major problem for children in strollers is sun exposure. This is particularly true between about 10 AM and 2 PM, when the sun's radiation is strongest. Sun exposure has been increasingly recognized in recent years as a risk factor for skin cancer. Exposure to ultraviolet radiation is a particular risk. Skin cancer is an important public health problem; studies estimate that 1 in 7 children will get skin cancer. Sunburns in childhood also greatly increase the risk of skin cancer. With the erosion of the ozone layer, sun exposure is expected to become an even greater hazard in the future.

Concerns about sun exposure can limit the hours when outings are possible to the early morning or late in the day. Given the tight schedules of many caregivers, scheduling outings around limits like these is difficult. Small children have little concept of a future, and generally do not react well to having a walk postponed when they want to go outside now.

Several devices exist for dealing with the problem of sun exposure in strollers. Sunscreen can be used on the child. Sunscreen is expensive, messy and time-consuming to apply, and children often resist it. Sunscreen must be reapplied frequently. Sunscreen cannot be used at all on very young infants. Sunscreen offers no protection against rain or insects.

Some strollers come equipped with fabric sunshades. One common type of sunshade is supported by a rigid framework at the top of the stroller. The framework may or may not pivot out of the way when not in use. The effectiveness of a stroller sunshade is generally determined by its size. A large sunshade tends to be awkward to handle, particularly when a stroller is folded. Most stroller sunshades therefore are small. A small sunshade can provide shade to only a limited area, often leaving most of the child's body unprotected. If the sun is in the wrong place, a stroller sunshade may offer no protection at all.

Fabric stroller sunshades also have other problems. Stroller sunshades offer no protection against insects. Being made of fabric and covering only a limited area, stroller sunshades do not protect well against rain. Being opaque, stroller sunshades block a child's view. The larger the sunshade, the more the child's view is blocked.

A stroller sunshade can be supplemented by draping a blanket over the sunshade framework in the direction from which the sun is shining. This provides more shade but blocks the child's view. The blanket tends to come loose and fall off, so that it must be rearranged frequently. The blanket must also be rearranged whenever the angle of the sun changes, as when a corner is turned. Blankets block air circulation.

Some strollers have a large fabric sunshade whose rigid framework is collapsible when not in use. These sunshades provide more shade, but also block more of the child's view. Collapsible fabric sunshades often also do not protect a child's entire body, often leaving the feet and legs exposed to the sun. Some types of collapsible sunshades can extend sufficiently to make a dark enclosure within which a child can nap. However, since the fabric blocks air circulation, such an enclosure can quickly become unbearably hot in hot weather.

Umbrellas and similar shading devices are known which attach to a stroller by a flexible arm, which can be bent to shade the child as necessary. These devices overcome some of the difficulties of a simple blanket, but have disadvantages of their own. Shading devices are bulky. Shading devices cover only a limited area, often leaving much of the child's body unprotected. These devices also must be rearranged each time the angle of the sun changes. The child's view is blocked in the direction of the shading device. Typical shading devices offer no protection against insects and only very limited protection against rain.

Flying insects are another problem for children in strollers. Mosquitoes are a particular problem, but bees, wasps, and flies can also be annoying or even dangerous. Mosquito bites are irritating and can also spread disease. Bee and wasp stings are painful at best and can be life-threatening in children with allergies. Insect activity varies with the time of day and with proximity to breeding areas and the like. Mosquitoes, for example, breed in water and typically are most active in the evening. Mosquito activity can limit outings near lakes and other water sources. Mosquito activity may also further limit the times when outings are possible, in addition to the limits imposed by sun exposure.

Another problem for children in strollers is rain. Pushing a stroller generally requires two hands. It is therefore very difficult for a caregiver to keep a child dry in a rainstorm, even if the caregiver is equipped with an umbrella. A wet child is likely to be cold and cranky in all but the hottest weather. Possibilities for outings are therefore even more restricted when rain is predicted. In combination with the limits imposed by sun and insects, the result can be an unhappy child who rarely gets outside and a caregiver who gets little exercise.

Transparent plastic rain covers for strollers are known. Rain covers are typically supported by the same rigid framework used for a fabric sunshade. The front of the rain cover therefore is close to the child's face and within the reach of even a small infant. This can lead to the child pulling at the cover, which may quickly be torn or wear out. In windy conditions, the raincover can blow onto the child's face. The child's view remains blocked by the sunshade. Being made of transparent plastic, the rain cover cannot be used when the sun shines, due to the greenhouse effect. The plastic also blocks air circulation, so that the rain cover cannot be used in hot weather. Since the plastic is transparent, the rain cover cannot be used for a dark enclosure in which a child can nap.

Many exemplary devices having the above stated disadvantages are known in the patent literature. For example, U.S. Pat. No. 4,582,355, issued Apr. 15, 1986, and Canadian Patent Document No. 1,198,028, published Dec. 17, 1985, both to Hall, disclose a retractable weather guard for a stroller. The weather guard is supported by the stroller canopy. U.S. Pat. No. 5,184,865, issued Feb. 9, 1993 to Mohtasham, discloses a collapsible insect netting assembly for use with a baby stroller. U.S. Pat. No. 5,542,732, issued Aug. 6, 1996 to Pollman, discloses a shade for a canopied stroller having a fabric shading panel. The fabric shading panel is composed of a fabric material which allows only a portion of the ambient ultraviolet radiation to pass through. French Patent Document No. 2,380,180, published Oct. 13, 1978, discloses a flexible roll-up film for a retractable motorcycle windscreen using inflatable borders as stiffening elements.

Many other examples of the prior art various types of sunshades or netting for covering a baby carrier. Examples of such are, U.S. Pat. Nos. 1,289,965, issued Dec. 31, 1918 to Tichenor; 2,789,863, issued Apr. 23, 1957 to Shimabukuro; 3,227,484, issued Jan. 4, 1966 to Merclean; 3,834,756, issued Sep. 10, 1974 to Grell; 5,758,889, issued Jun. 2, 1998 to Ledakis; and 5,494,329, issued Feb. 27, 1996 to Gonzalez et al., all of which are generally cumulative representations of the prior art as addressed above.

None of the above inventions and patents, taken either singly or in combination, is seen to describe the instant invention as claimed.

SUMMARY OF THE INVENTION

The present invention is a multi-layer protective shield for a stroller. The protective shield has an inflatable frame and provides protection against sun, rain, and insects. The protective shield includes at least two protective layers. At least one layer is resistant to UV radiation. The layers include a film layer adapted to protect a child seated in the stroller from rain. At least one layer is a netting layer adapted to protect the child from flying insects. The inflatable frame pivots into a closed position and at least one extended position. The protective layers also pivot from a furled position to an unfurled position. In the unfurled position the protective layers are supported by the frame. The layers may include an opaque layer composed of a flexible metalized plastic material. One or more fans may be included to encourage air circulation.

Accordingly, it is a principal object of the invention to provide a multi-layer protective shield for a stroller which protects the body of a child seated in the stroller from sun, insects, rain, and wind as necessary.

It is another object of the invention to provide a shield for a stroller which can be used with a stroller lacking a canopy and which protects the child in the stroller from the sun while still allowing an unobstructed view in all directions, including upward.

It is another object of the invention to provide a protective shield for a stroller having a lightweight, inflatable frame which can be pivoted and secured out of the way or deflated for storage of the protective shield in a minimum of space.

It is a further object of the invention to provide a shield for a stroller having a protective layer which blocks 50–100% of the ultraviolet radiation.

Still another object of the invention is to provide a shield for a stroller having a protective layer which is resistant to rain.

Another object of the invention is to provide a shield for a stroller having a protective layer which is resistant to mosquitoes and other flying insects.

Another object of the invention is to provide a shield for a stroller having a protective layer which is resistant to wind.

Another object of the invention is to provide a shield for a stroller having a protective layer which is opaque and reflects heat and light radiation.

It is an object of the invention to provide a shield for a stroller in which the protective layers include one or more flaps and/or one or more fans to encourage air circulation.

Another object of the invention is to provide a protective shield for a stroller which can include a variety of inflatable novelty extensions.

Another object of the invention is to provide a shield for a stroller which is simple and inexpensive to manufacture.

It is an object of the invention to provide improved elements and arrangements thereof in an apparatus for the purposes described which is dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a multi-layer protective shield for a stroller. The protective shield has an inflatable frame and provides protection against sun, inclement weather (e.g., rain, wind, precipitation), and insects. The shield may be provided as a separate accessory for use with a preexisting stroller, or may be incorporated in the design of the stroller.

Figure 1:
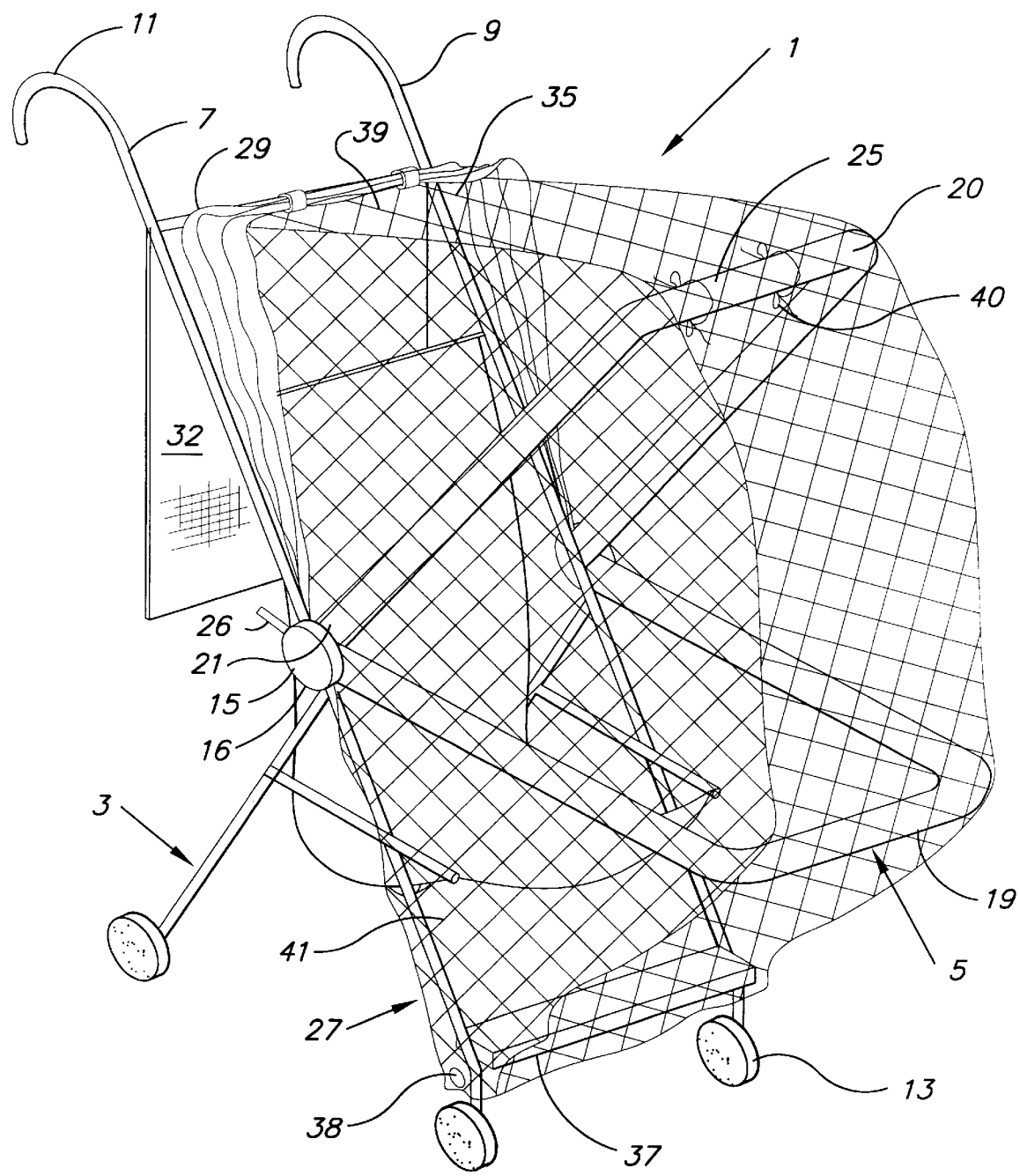
FIG. 1 is an environmental, perspective view of a protective shield for a stroller, shown with the netting layer in the unfurled position.

FIG. 1 is an environmental, perspective view of a protective shield 1 for a stroller 3. The shield 1 includes a frame 5 and at least two protective layers. The frame 5 is attached to the stroller 3. The stroller 3 is of conventional design and has a first side 7, a second side 9, a handle end 11, and a wheel end 13.

Figure 3:
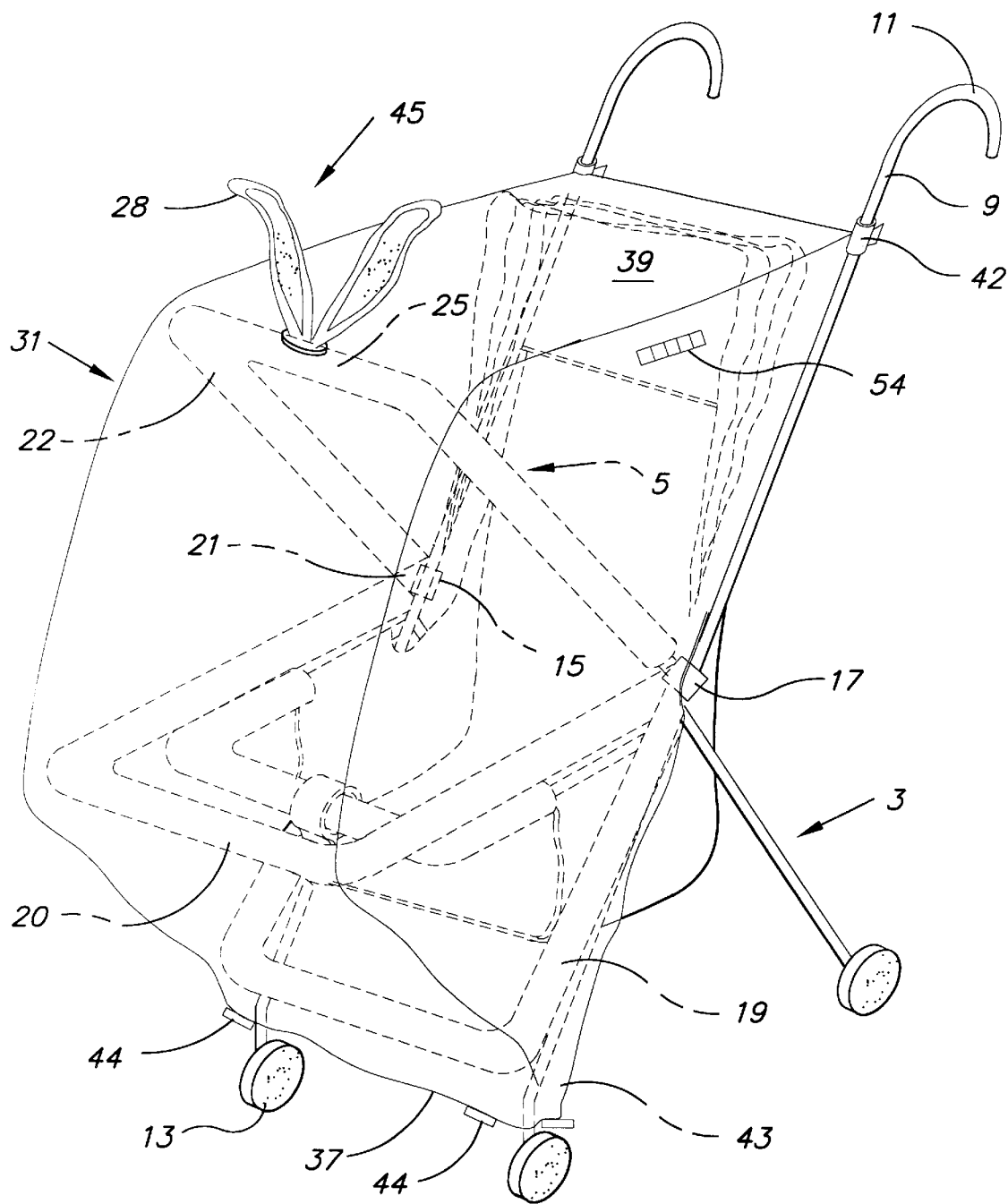
FIG. 3 is an environmental, perspective view of a third embodiment of the invention having three shield supports and a novelty extension, shown with the opaque layer in the unfurled position.
Figure 4:
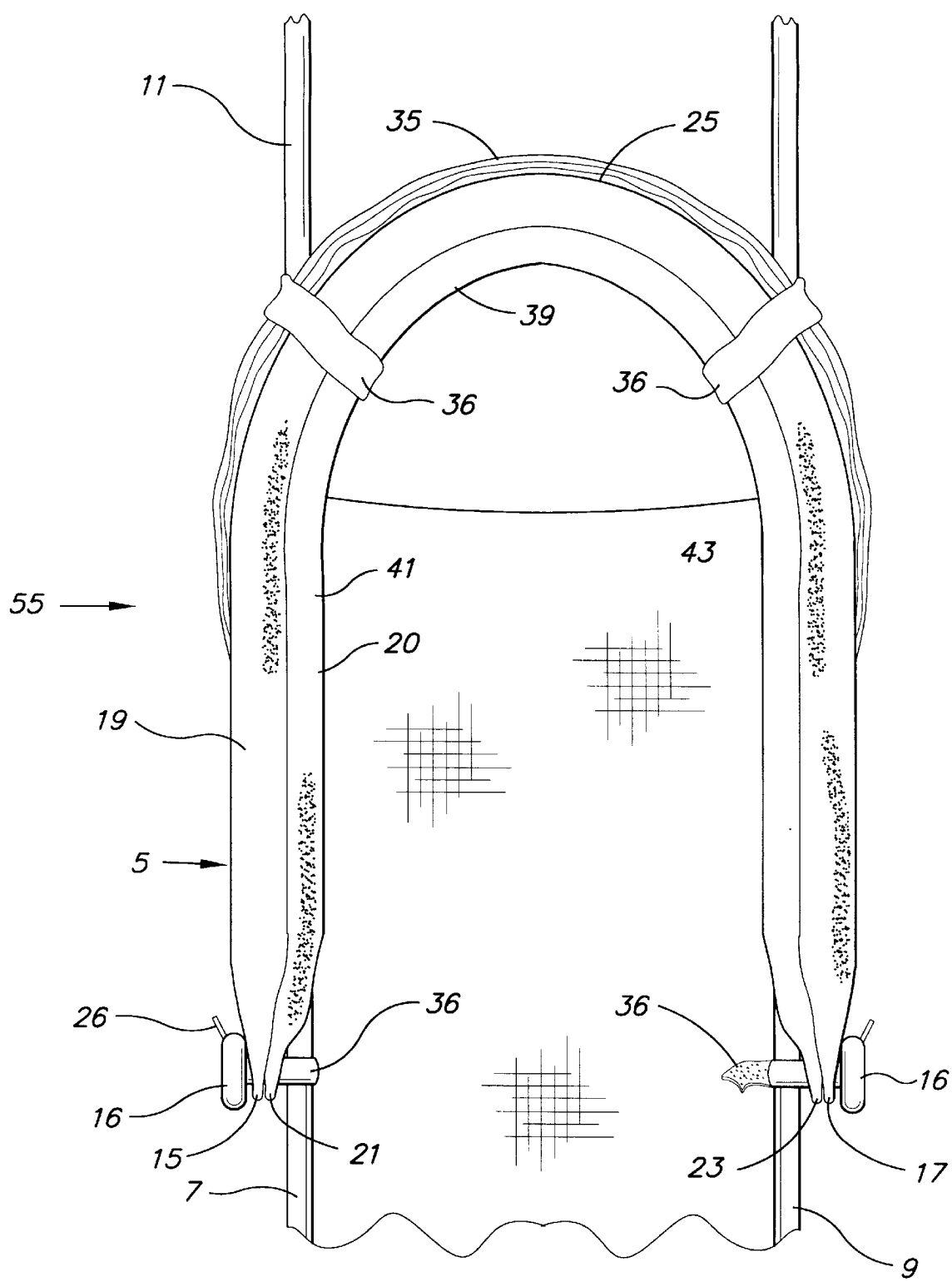
FIG. 4 is a detail, front view of a fourth embodiment of the invention having a rounded end, shown in the closed position.

The frame 5 includes at least one shield support. The frame 5 includes at least a first shield support 19, as shown in FIGS. 1, 2, 3, and 4. The shield preferably includes a second shield support 20, as shown in FIGS. 1, 3 and 4. The shield 1 may include a third shield support 22, as shown in FIG. 3.

Each shield support is generally U-shaped and constructed of a flexible plastic sheeting configured to have a common air passage for inflation to the U-shape. The common air passage allows all of the shield supports to be inflated simultaneously through a single valve 26. Each shield support has a first end 21, a second end 23, a free end 25, and a length extending from the first and second ends 21 and 23 to the free end 25. The free ends 25 of the shield supports may be flat, as in FIGS. 1, 2, and 3, or rounded, as in FIG. 4.

Preferably each shield support has a generally circular cross-section. Preferably each shield support has a diameter of at least two inches. Preferably the shield supports are composed of plastic and are generally transparent. The plastic is sufficiently rigid to support the protective layers when inflated and is thick enough to withstand repeated inflating, deflating, and rough usage. Suitable plastics are commercially available for use in wading pools, flotation aids, and other inflatable devices.

The shield supports may include one or more novelty extensions 28, as shown in FIG. 3. Since the shield supports are inflatable like balloons, they are uniquely suited to including inflatable novelty extensions 28 in a variety of fanciful shapes. For example, the first shield support 19 might include a novelty extension 28 in the form of an elephant's trunk or a rabbit's nose. The second shield support 20 might include a pair of elephant or rabbit ears. The features of cartoon characters might be used as novelty extensions.

Each of the protective layers would include an opening for the novelty extension 28 to pass through without being compressed under the layer. The protruding novelty extension 28 would help to secure the protective layers to the shield supports and prevent the protective layers from being disarranged or flapping in the wind.

The shield support or supports and the novelty extension 28 would preferably have a common air passage, so that both could be inflated simultaneously. Alternatively, the novelty extension 28 might inflate separately so that the novelty extension 28 could be pulled uninflated through the openings in the protective layers, then inflated later.

The first and second ends 21 and 23 of each shield support may include a narrow or flattened section. The narrow section allows for easier attachment to the first and second anchor points 15 and 17. A narrow section is shown for the second end 23 of the third shield support 22 in FIG. 3. Flattened narrow sections are shown in FIG. 4 for the first and second ends 21 and 23 of shield supports 19 and 20.

The frame 5 has a first anchor point 15 and a second anchor point 17. The first end 21 of each shield support is attached to the first side 7 of the stroller 3 at the first anchor point 15. The second end 23 of each shield support is attached to the second side 9 of the stroller 3 at the second anchor point 17. The anchor points 15 and 17 are preferably located approximately halfway between the handle end 11 and the wheel end 13 of the stroller 3.

Each shield support pivots with respect to the stroller 3, so that each shield support has a closed position and at least one extended position. Each of the first and second anchor points 15 and 17 may include a hinge 16. The first and second ends 21 and 23 of each shield support may be pivotally connected to the hinge 16, as shown in FIGS. 1 and 4.

Alternatively, the shield supports may be flexible enough to simply flex into the closed position when desired, without a pivot connection or a hinge. The shield supports are then held in the closed position by attaching them to the handle end 11 of the stroller 3. If desired, the shield supports may be partially or completely deflated to allow them to flex into the closed position.

The shield supports 19, 20, 22 of the frame 5 can pivot into an extended position when desired, and can pivot out of the way into a closed position when desired. Preferably all of the shield supports fold compactly into the closed position with the free end 25 of each shield support 19 located near the handle end 11 of the stroller 3.

Preferably the first shield support 19 has a greater length than the second shield support 20, and the second shield support 20 has a greater length than the third shield support 22. Most preferably the lengths and widths of each successive shield support differ by an amount approximately equal to the diameters of the shield supports. All of the shield supports in the closed position can therefore fit snugly together and are easily secured to the stroller 3, as shown in FIG. 4.

The shield 1 includes at least two protective layers. At least one of the protective layers is resistant to ultraviolet radiation. The protective layers include a netting layer 27 and a film layer 29. Either the netting layer 27, the film layer 29, or both may be resistant to ultraviolet radiation. The protective layers may include an opaque layer 31.

Each of the protective layers has a top end 35 and a bottom end 37. Each protective layer has three sections, each extending lengthwise from the top end 35 to the bottom end 37. The three sections are a center section 39, a first side section 41, and a second side section 43. The first and second side sections 41 and 43 are preferably generally semicircular. The center section 39 preferably has the shape of an elongated rectangle. The sections may be integrally connected to each other.

The top end 35 of each protective layer is attached to the stroller 3 at an upper attachment, proximate to the handle end 11 of the stroller 3. The first side section 41 of each protective layer is attached to the first anchor point 15. The second side section 43 of each protective layer is attached to the second anchor point 17.

At least one of the ends of each protective layer pivots with respect to the stroller 3, so that each protective layer has a furled position and at least one unfurled position. Preferably the bottom ends 37 of each protective layer pivot with respect to the stroller 3. Each protective layer extends far enough in the unfurled position so that the child's legs are protected.

Each protective layer in the unfurled position is supported by each shield support in the extended position. The length of each shield support is sufficiently long to support each protective layer in the unfurled position substantially away from the body of the child. A shield support which can extend directly ahead is beneficial in keeping the protective layers out of the child's reach when the wind is blowing. The shield supports are short enough not to project past the handle of the stroller 3. If the stroller has a canopy or sunshade which cannot be collapsed or pivoted out of the way, the shield supports should be long enough so that there is no interference. Alternatively, the canopy can be used as an additional support point for the shield.

Preferably the protective layers are supported on the exterior of the shield supports. However, one or more of the layers may be suspended inside of the shield supports. For example, the netting layer 27 might be attached to the interior surface of the shield supports, with the other layers supported on the exterior surface.

The shield may be either releasably or permanently attached to the stroller 3. Since the frame 5 is inflatable and lightweight, secure attachment is important to prevent the shield from blowing away in the wind. Secure attachment helps to prevent the protective layers from flapping.

The first and second ends 21 and 23 of each shield support are attached to the first and second sides 7 and 9 of the stroller 3 respectively by a first fastening means. The top ends 35 of the protective layers are attached to the handle end 11 of the stroller by a second fastening means. The bottom ends 37 of the protective layers in the unfurled position are attached to the wheel end 13 of the stroller by a third fastening means. All of the fastening means are preferably releasable, even if the shield is incorporated into the stroller design, so that the layers may be removed for cleaning.

The first, second, and third fastening means may be any of a variety of fastening means, including hook and loop fastener 36, snap 38, tie 40, and clip 42. Preferably the first, second, and third fastening means are hook and loop fastener 36. Various other types of fasteners may be used, such as a single hook with a corresponding elastic loop, or a pair of hooks.

Weights 44 may be used as a fastening means. Weights 44 may be particularly suited for use as the third fastening means at the wheel end 13 of the stroller 3, as shown in FIG. 3. The weights 44 do not require any time to attach or release, and effectively secure the bottom 37 of the protective layer against blowing away or flapping in the wind.

An inflatable frame has several advantages. Many strollers, particularly inexpensive umbrella strollers, do not include a canopy or sunshade of any kind. This type of stroller cannot use a raincover or sunshade which is designed to be attached to a preexisting canopy framework. The inflatable frame is lightweight. Since the frame has no rigid parts, it can easily be folded. The shield does not have to be removed from the stroller when the stroller is folded.

Deflated, the shield can be stored in a very small space. This is useful not only for caregivers but also for shipping and retailing, since the shield does not require a large box or a great deal of shelf space. This reduces the cost of the shield to the consumer.

The protective layers include a netting layer 27, as shown in FIG. 1. FIG. 1 shows the netting layer 27 in the unfurled position. The netting layer 27 is adapted to protect the body of the child from flying insects. The netting layer 27 is composed of netting. The netting is generally transparent and generally impervious to flying insects. The netting is sufficiently fine to keep out insects the size of mosquitoes or larger. Suitable mosquito netting is commercially available.

Alternatively, the netting may be fine enough to keep out gnats and other tiny flying insects. The netting of the netting layer 27 may be a fabric resistant to ultraviolet radiation. However, preferably protection against ultraviolet radiation is provided by the film layer, and the netting is no finer than mosquito netting. This arrangement helps to maintain air circulation in hot weather.

Preferably the netting layer 27 is the protective layer closest to the child in the stroller. The netting layer 27 may serve as the foundation layer, stabilizing the shield supports and the other layers. The netting layer 27 provides the greatest air circulation and does not interfere with the functions of either the film layer 29 or the opaque layer 31.

As the foundation layer, the netting layer 27 may be attached to each of the shield supports by one or more netting attachments. The netting attachments may be tie fasteners 40 as in FIG. 1, hook and loop fastener, or other fastening means. The netting attachment may be a sleeve of netting fitting around the shield support. The netting attachment may or may not be releasable. The netting attachment may serve as the second fastening means to secure the netting layer and shield supports in the closed position. The netting attachment may also be used as the second fastening means to secure all of the protective layers in the furled position as desired.

The bottom end 37 of the netting layer 27 may include a fourth fastening means so that the side sections 41 and 43 of the netting layer may be secured together beneath the seat of the stroller. This provides more complete protection from flying insects. The bottom end 37 of the netting layer 27 may include one or more securable flaps for the same purpose.

Figure 2:
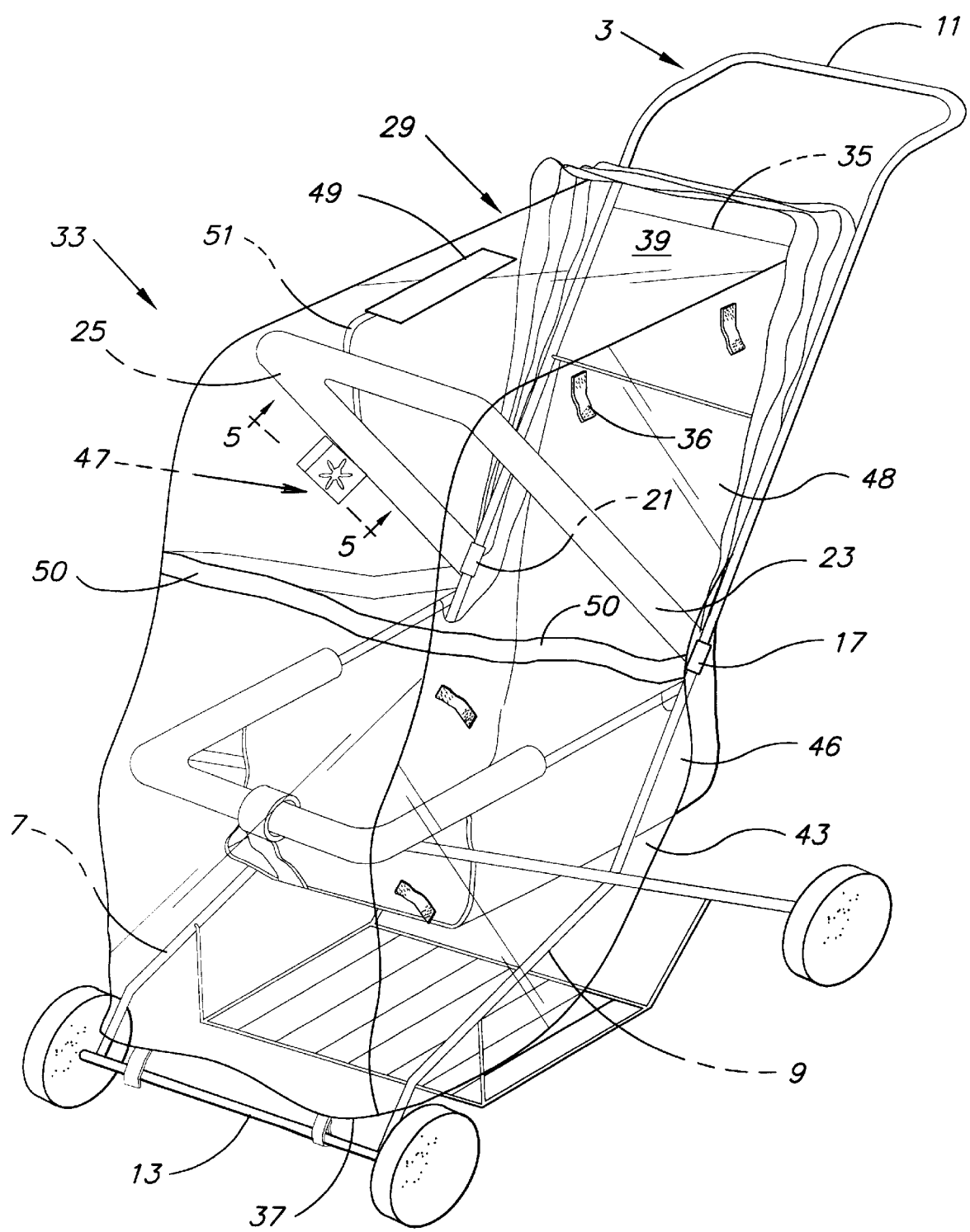
FIG. 2 is an environmental, perspective view of an alternative embodiment of the invention having a single shield support and a fan, shown with the film layer in the unfurled position.

The protective layers include a film layer 29, best seen in FIG. 2. FIG. 2 is an environmental, perspective view of an alternative embodiment 33 of the invention. The shield 33 includes a single shield support 19. FIG. 2 shows the film layer 29 in the unfurled position.

The film layer 29 is adapted to protect a body of a child seated in the stroller from inclement weather. The film layer 29 is composed of a plastic film. The plastic film of the film layer 29 is generally transparent and generally impervious to water. Preferably the plastic film of the film layer 29 is resistant to ultraviolet radiation. The plastic film blocks at least 50% of the ambient ultraviolet radiation. Preferably the plastic film has an SPF of at least 15. Most preferably the plastic film blocks 100% of the ultraviolet radiation, without blocking the child's view. Suitable plastic films are commercially available.

The use of a film layer resistant to ultraviolet radiation supported by an inflatable frame provides many advantages. The child in the stroller has an all-around view, including directly overhead. This helps to keep the child interested and occupied.

The caregiver pushing the stroller also has an unobstructed view of the child. This allows the caregiver to see what the child is doing at all times. The caregiver can easily determine when the child's view has become obstructed, such as by a hat slipping over the eyes, and correct the situation. The caregiver can intervene immediately if the child picks up something dangerous during an outing, such as dog feces or a leaf from a plant which might be poisonous.

Since the plastic film is resistant to solar radiation, the greenhouse effect does not heat the interior, as would be the case with ordinary clear plastic film. The child in the stroller stays cool. The child's entire body is protected from the sun. This is especially useful in situations where the child will be outdoors for an extended period, such as an amusement park. The plastic film is also wind-resistant, so the child is not disturbed by the wind. The film layer 29 is preferably removable for cleaning.

If the netting layer 27 is used as a foundation layer for the film layer 29, the plastic film of the film layer 29 can be thin. The netting layer 27 supports the film layer 29 and helps to prevent punctures and tears in the plastic film. Even an older child with a long reach cannot grasp the film layer 29, since it is protected by the netting layer 27.

The film layer 29 may have an appropriate child-oriented design, such as cartoon figures. The design may be printed or silkscreened on, or stickers may be applied. The cartoon figures may be transparent, or may be small enough so that the child's overall view through the film layer is not obscured. If the shield supports include a novelty extension 28, the design may be related. For example, if the shield supports include a pair of rabbit ears, the remaining rabbit's body may be printed on the film layer 29.

Each of the first and second side sections 41 and 43 of the protective layers may include two or more flaps, as shown in FIG. 2 for the film layer 29. Preferably the first and second side sections 41 and 43 of the film layer 29 each include two flaps, a lower flap 46 and an upper flap 48. Each flap 46 and 48 is releasably attached proximate to the center section 39 of the protective layer, so that each of the flaps has a raised position. Each flap 46 and 48 may roll up or fold up independently and be secured by hook and loop fastener 36. The raised position is adapted to encourage air circulation to the child in the stroller. If desired, one or both flaps may be raised on both side sections 41 and 43 with the center section 39 remaining extended. This combines sun protection with excellent air circulation.

The upper and lower flaps 46 and 48 may connect along a seam 50. Preferably the upper flap 48 overlaps the lower flap 46 to some extent so that rain or precipitation, or even wind, will be shed from the seam 50. The seam 50 may extend only across the side sections 41 and 43, or may extend across the center section 39 as well, as shown in FIG. 2. The seam 50 may be secured closed with hook and loop fastener, then released to fold back one or both flaps.

The shield may include a back flap 32. The back flap 32 is preferably generally rectangular in form. The back flap 32 is preferably composed of a plastic film. The back flap 32 may be integrally connected to the top end 35 of the film layer 29. The back flap 32 may include one or more pockets for storage. The pockets may or may not be integrally attached to the back flap. The pockets may be stitched or bonded to the film.

The shield may include a fan 47, as shown in FIG. 2. The fan 47 is preferably powered by solar power or battery power. Other power sources, such as mechanical winding, may be used. Preferably the fan 47 is located in the film layer 29, approximately level with the shoulders or neck of a child in the stroller 3. This allows for efficient cooling of the child. The fan 47 may also be mounted in one of the other protective layers, or on a shield support. The fan 47 is preferably a 12 volt, 2-speed fan.

Most preferably the fan 47 is powered by at least one solar panel 49. The center section 39 of the film layer 29 in the unfurled position may have a solar panel 49 located between the free end 25 of one of the shield supports and the handle end 11 of the stroller 3. This position allows for the maximum amount of sunlight to fall on the solar panel 49. Alternatively, the solar panel 49 may be located immediately adjacent to the fan 47. This would eliminate the need for wires 51 connecting the fan 47 to the solar panel 49.

The protective layers preferably include an opaque layer 31, best seen in FIG. 3. FIG. 3 is an environmental, perspective view of a third embodiment 45 of the invention. The shield 45 has three shield supports. FIG. 3 shows the opaque layer 31 in the unfurled position. If present, the opaque layer 31 is preferably the outermost layer, since it is likely to be used somewhat less frequently than the netting or film layers. Each side section of the opaque layer 31 may include two flaps, similar to the flaps 46 and 48 of the film layer 29 shown in FIG. 2.

The opaque layer 31 is adapted to reflect light and heat radiation. The opaque layer 31 is composed of a flexible metalized plastic material. Suitable flexible metalized plastic materials are available under the trademarks ALUMINIZED MYLAR and SPACE BLANKET.

The flexible metalized plastic material has a reflective surface. The reflective surface is preferably the exterior surface of the opaque layer 31, facing away from the child in the stroller 3. This allows light and heat radiation to be reflected away from the child in hot weather. This keeps the interior of the shield 45 cool in summer or in warm climates.

In winter or during cold weather, it may be desirable for the reflective surface to be the interior surface of the opaque layer 31. The opaque layer 31 may be reversible, so that the reflective surface may be oriented as desired. The opaque layer 31 is preferably removable for cleaning.

The opaque layer 31, in the unfurled position provides a quiet, cool, stimulus-free environment for quiet activities such as napping. A child who falls asleep while on an outing in the stroller can continue to sleep without being disturbed by passing people, animals, traffic, or the like. A child can sleep without difficulty even in a noisy place with people moving around, such as a restaurant or mall. If present, the flaps allow the caregiver to easily check on the sleeping child.

A thermometer 54 may be incorporated into any of the protective layers or one of the shield supports. The thermometer 54 is preferably an easy-to-read flat panel liquid crystal thermometer. Suitable thermometers are commonly available for use in aquariums. The thermometer allows the caregiver to see at a glance whether the child is becoming overheated.

FIG. 4 is a detail, front view of a fourth embodiment 55 of the invention in the closed and furled position. The free ends 25 of the first and second shield supports 19 and 20 are rounded. The top ends 35 of the protective layers are secured to the handle end 11. The shield supports are pivotally attached at each of the first and second ends to a hinge 16. The shield supports and the hinge have a common air passage and are simultaneously inflated or deflated through the valve 26. Both hinges 16 are attached to the sides 7 and 9 of the stroller by the first fastening means. The first fastening means of the shield 55 is hook and loop fastener 36.

Figure 5:
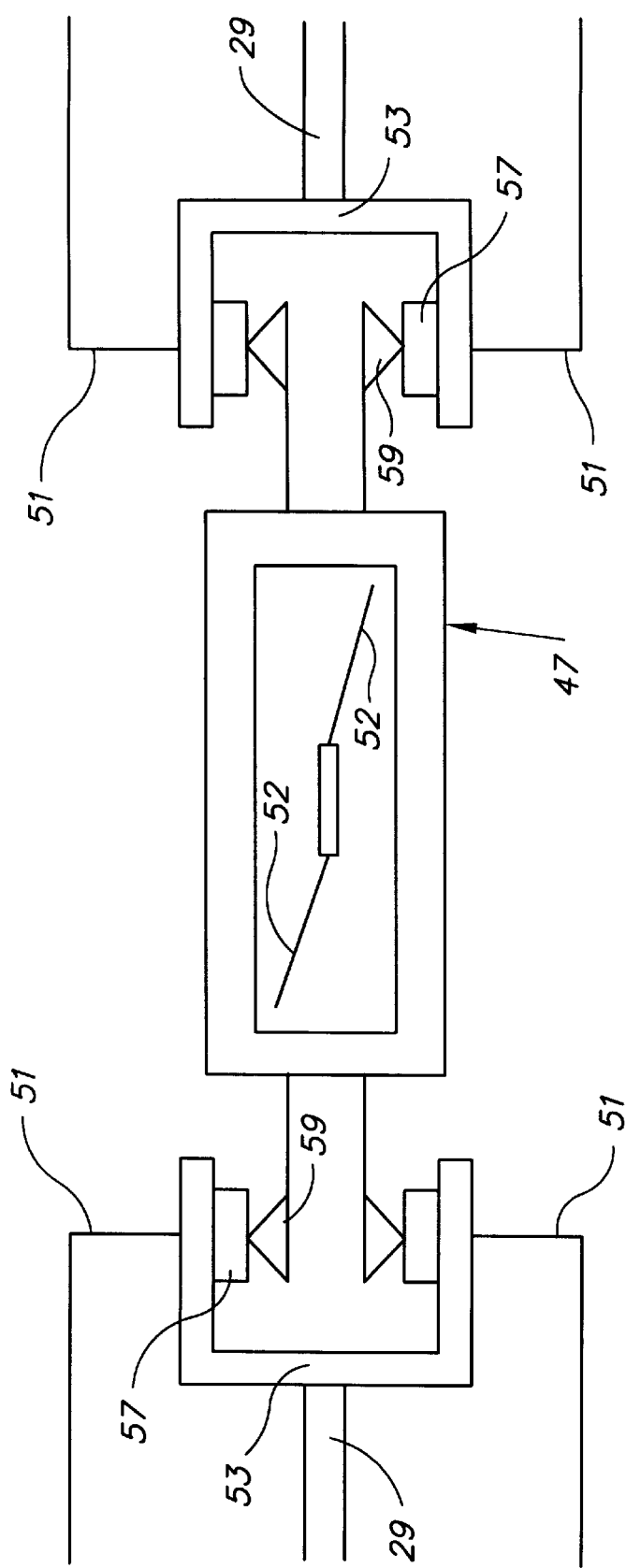
FIG. 5 is a diagrammatic, sectional view of the fan of FIG. 2.

FIG. 5 is a detail, sectional view of the fan 47, taken along line 5—5 of FIG. 2. Preferably each fan 47 is releasably attached to a channel 53 in the film layer 29. The channel 53 is located in one of the side sections 41 or 43 of the film layer 29. Preferably the fan 47 is not located in the top of the center section 39, to prevent water leaking around the fan 47 or through the channel 53 when the fan is removed. The channel 53 may be oriented horizontally or vertically.

The fan 47 is slid into and out of the channel 53 in a tongue and groove arrangement. The sides of the channel 53 include channel electrical contact points 57, diagrammatically shown in FIG. 5. The sides of the fan 47 have fan electrical contact points 59. The electrical contact points 57 and 59 come into contact when the fan 47 is slid into the channel 53. The channel 53 may be rigid or semi-rigid. The channel 53 may include a fastening means, such as hook and loop fastener, to secure the fan 47. The attachment of the wires 51 connecting the fan 47 to the solar panel 49 is diagrammatically shown. The fan blades 52 are shown in cross section.

When the fan 47 is not in use, such as during cold weather, the fan 47 may be removed from the channel 53 and stored. The channel 53 may include a flap or an insert to make the channel opening watertight when the fan 47 is removed. The fan 47 may be sold as a separate accessory to the shield.

Each fan 47 may have two opposing directions for attaching to the channel 53. Preferably one direction is an intake position, and the other direction is an exhaust position. The direction of air movement may then be reversed simply by removing the fan 47 from the channel 53, flipping the fan over, and slipping the fan back into the channel 53. A single fan 47 can be switched from side to side as needed.

Most preferably the shield includes a first fan and a second fan. The channel 53 of the first fan is located in the first side section of the film layer 29. The channel 53 of the second fan is located in the second side section of the film layer. The fans may be arranged with one in the intake position and the other in the exhaust position. This results in a continuous strong flow of fresh air and very efficient cooling. Stroller outings are therefore enjoyable even in the hottest weather.

The shield may include a heater for use in cold weather. The heater would slide into the same channels as the fan. The heater might be incorporated into a fan so that warm air would be circulated around the child.

The shield provides multiple protective layers which protect a child seated in a stroller from environmental elements, such as sun, insects, inclement weather (e.g., rain, precipitation), and wind as necessary. The desired protective layer or layers can be quickly pulled into position over the shield supports. When a corner is turned or the angle of the sun changes, nothing has to be rearranged. The child can be protected from the sunburn and skin cancer even in a stroller which lacks a built-in sunshade or canopy. The child can be taken out for outings whenever he is restless or whenever convenient for the caregiver. Outings are not limited to certain times of day. The caregiver gets plenty of exercise and does not have to fuss with blankets, sunscreen, or sun hats. The child's entire body is readily protected from the sun, without blocking his view. Inclement weather, such as rain or threatened rain, does not interfere with outings. The caregiver does not have to worry about insect bites. The child can see his surroundings in any weather. The child can also have a cool, quiet, stimulus-free enclosure for naps or other quiet activities. When the weather or other conditions change, the layers can be quickly rearranged or folded away.

It is to be understood that the present invention is not limited to the sole embodiments described above, but encompasses any and all embodiments within the scope of the following claims.

We claim:

1. A protective shield for a stroller, the stroller having a first side, a second side, a handle end, and a wheel end, said shield comprising:
   (a) a frame adapted for removable attachment to the stroller, said frame including at least one inflatable shield support, said at least one shield support being generally U-shaped and having a first end, a second end, a free end, and a length extending from said first and second ends to said free end, said first end and said second end of said at least one shield support being adapted for removable attachment to said first and second sides of the stroller, said at least one shield support being further adapted for pivoting with respect to the stroller;

said at least one shield support having a closed position and at least one extended position when pivotally attached to the stroller;

(b) a plurality of protective layers, each of said protective layers having a top end, a bottom end, a center section, a first side section, and a second side section, said top end of each of said protective layers being adapted for attachment to the stroller proximate to the handle end of the stroller, said first and second side sections of each of said protective layers being further adapted for attachment to the stroller, one of said ends of each of said protective layers being adapted for pivoting with respect to the stroller;

each of said protective layers having a furled position and an unfurled position, each of said protective layers in said unfurled position being supported by said at least one shield support in said extended position;

said protective layers including
   (i) a film layer being generally translucent, resistant to ultraviolet radiation and generally impervious to water for protecting a child from inclement weather;
   (ii) a netting layer being generally translucent and generally impervious to insects for protecting the child from insects; and
   (iii) an opaque layer adapted for reflecting light and heat radiation, said opaque layer being composed of a flexible metalized plastic material.

2. The shield according to claim 1, wherein said frame includes a first shield support and a second shield support, said first shield support having a first length, said second shield support having a second length, said first length being greater than said second length, said first and said second shield supports being composed of plastic, and generally translucent;
   wherein said first and said second shield supports are adapted to be inflated having a common air passage;
   whereby both said first and said second shield supports are inflated simultaneously via a single valve.

3. The shield according to claim 1, wherein said netting layer is attached to said at least one shield support.

4. The shield according to claim 1, wherein said at least one shield support includes means for providing a novelty extension.

5. The shield according to claim 1, further comprising a back flap, said back flap being generally rectangular in form, said back flap being composed of a plastic film, and said back flap being integrally connected to said top end of said film layer.

6. The shield according to claim 1, further comprising a thermometer.

7. The shield according to claim 1, wherein said first and said second ends of said at least one shield support adapted to be attached to the first and second sides of the stroller respectively by a first means for fastening, said top ends of each said at least two protective layers adapted to be attached to the handle end of the stroller by a second means for fastening, and said bottom ends of each of said at least two protective layers in said unfurled position adapted to be attached to the wheel end of the stroller by a third means for fastening, wherein each of said first, second, and third fastening means being selected from the group consisting essentially of hook and loop fastener, snap, tie, clip, and weight.

8. The shield according to claim 7, wherein said first, said second, and said third means for fastening are hook and loop fastener.

9. A protective shield for use with a baby carrier, the baby carrier having a first side, a second side, a handle end, and a wheel end, said shield comprising:
   (a) a frame adapted to be attached to the baby carrier, said frame including at least one inflatable shield support, said at least one shield support being generally U-shaped and having a first end, a second end, a free end, and a length extending from said first and second ends to said free end, said first end and said second end of said at least one shield support being adapted for removable attachment to said first and second sides of the baby carrier, said at least one shield support being further adapted for pivoting with respect to the baby carrier;

said at least one shield support having a closed position and at least one extended position when pivotally attached to the stroller;

(b) at least two protective layers, one of said protective layers being resistant to ultraviolet radiation, each of said at least two protective layers having a top end, a bottom end, a center section, a first side section, and a second side section, said top end of each of said at least two protective layers being adapted for attachment to the baby carrier proximate to the handle end of the baby carrier, said first and second side sections of each of said at least two protective layers being adapted for attachment to the baby carrier, the bottom end of each said at least two protective layers being adapted for pivoting with respect to the baby carrier;

each of said at least two protective layers having a furled position and an unfurled position, each of said at least two protective layers in said unfurled position being supported by said at least one shield support in said extended position;

each said side section of one of said at least two protective layers includes at least two flaps, each of said flaps being releasably attached proximate to the center section, so that each of the flaps has a raised position adapted for air circulation;

said at least two protective layers including
(i) a generally translucent film layer being generally impervious to environmental elements for protecting a baby from inclement weather; and
(ii) a generally insect impermeable netting layer being generally translucent for protecting the baby from insects.

10. The shield according to claim 9, wherein each said side section of the film layer includes two flaps.

11. The shield according to claim 9, further comprising at least one fan, the fan being powered by a means selected from the group consisting of solar power and battery power.

12. The shield according to claim 11, wherein the at least one fan is powered by at least one solar panel located on the center section of the film layer in the unfurled position.

13. The shield according to claim 12, wherein said at least one fan is releasably attached to a channel in the film layer, the channel being located in one said side section of the film layer.

14. The shield according to claim 13, wherein said at least one fan has two opposing directions for attaching to the channel, so that the fan has an intake position in one direction, and an exhaust position in the other direction.

15. The shield according to claim 13, wherein said at least one fan includes a first fan and a second fan, the channel of the first fan being located in the first side section of the film layer, and the channel of the second fan being located in the second side section of the film layer.

* * * * *